United States Patent
Cleghorn

(10) Patent No.: US 7,935,889 B1
(45) Date of Patent: May 3, 2011

(54) COVER WITH TIGHTENING HINGE

(75) Inventor: Richard Cleghorn, Tempe, AZ (US)

(73) Assignee: TayMac Corporation, Gilbert, AZ (US)

(*) Notice: Subject to any disclaimer, the term of this patent is extended or adjusted under 35 U.S.C. 154(b) by 0 days.

(21) Appl. No.: 12/628,940

(22) Filed: Dec. 1, 2009

Related U.S. Application Data

(63) Continuation of application No. 11/868,428, filed on Oct. 5, 2007, now Pat. No. 7,626,121.

(60) Provisional application No. 60/828,447, filed on Oct. 6, 2006.

(51) Int. Cl.
*H02G 3/14* (2006.01)

(52) U.S. Cl. ............... 174/66; 174/67; 174/53; 220/241; 220/242

(58) Field of Classification Search .............. 174/50, 174/53, 57, 58, 66, 67; 220/3.2–3.8, 4.02, 220/241, 242; 439/535, 536; D13/177; D8/353
See application file for complete search history.

(56) References Cited

U.S. PATENT DOCUMENTS

| | | | |
|---|---|---|---|
| 5,228,584 A | 7/1993 | Williams, Jr. | |
| 5,280,135 A | 1/1994 | Berlin et al. | |
| 5,317,108 A | 5/1994 | Prairie, Jr. | |
| 6,133,531 A | 10/2000 | Hayduke et al. | |
| 6,476,321 B1 | 11/2002 | Shotey et al. | |
| 6,891,104 B2 | 5/2005 | Dinh | |
| 6,960,721 B2 | 11/2005 | Shotey et al. | |
| 6,979,777 B2 | 12/2005 | Marcou et al. | |
| 7,241,952 B2 | 7/2007 | Dinh | |
| 7,462,777 B2 | 12/2008 | Dinh | |
| 7,626,121 B1 * | 12/2009 | Cleghorn | 174/66 |

* cited by examiner

*Primary Examiner* — Angel R Estrada
(74) *Attorney, Agent, or Firm* — Booth Udall, PLC

(57) ABSTRACT

An electrical device cover with a lid coupled to a base unit by a pin and clip hinge. Implementations of a pin and clip hinge may comprise a clip with a rotation stop that tightens against the pin when the lid is opened too far on the base in a way that would ordinarily overextend the hinge.

20 Claims, 3 Drawing Sheets

COVER WITH TIGHTENING HINGE

CROSS REFERENCE TO RELATED APPLICATIONS

This application is a continuation application of currently pending U.S. patent application Ser. No. 11/868,428 to Cleghorn titled "Electrical Outlet Cover with Tightening Hinge," which issued as U.S. Pat. No. 7,626,121 on Dec. 1, 2009 and claims the benefit of the filing date of U.S. Provisional Patent Application 60/828,447, entitled "Cover Hinge" to Richard Cleghorn which was filed on Oct. 6, 2006, the disclosures of which are hereby each incorporated entirely herein by this reference.

BACKGROUND

1. Technical Field

Aspects of this document relate generally to covers.

2. Background Art

Electrical outlets often need protection from water and other contaminants. To provide the needed protection, covers have been conventionally used, particularly when electrical outlets are mounted in outdoor or otherwise wet locations. A wide variety of cover designs have been devised. Some covers are configured as while-in-use covers (sometimes called "bubble covers" in particular configurations that include a bulged lid). Other covers are not configured as while-in-use covers, but are nevertheless weatherproof (sometimes called flat covers). U.S. Pat. No. 6,476,321 to Shotey et al. (issued Nov. 5, 2002), which disclosure is hereby incorporated herein by reference for its relevance to the manufacture and use of conventional covers, discloses both while-in-use cover examples and non-while-in-use cover examples. While-in-use covers are those which are configured such that an electrical cord and cord cap can be plugged into the electrical outlet within the cover while the lid to the cover is closed against the base.

Electrical covers may comprise a lid coupled to a base by a hinge. Hinges may be biased or non-biased, and are of many different configurations. One particular configuration of hinge is configured as a pin and clip hinge where a pin on a cover lid is fitted into a receiving clip on a base. Once the pin inserts into the clip, the clip retains the pin, but allows it to rotate freely where the lid and base components do not interfere. Example of this type of a pin and clip hinge are shown and described in U.S. Pat. Nos. 5,280,135 to Berlin et al. (issued Jan. 18, 1994), 7,241,952 to Dinh (issued Jul. 10, 2007), and 6,979,777 to Marcou et al. (issued Dec. 27, 2005).

One problem experienced with many clip and pin hinges is that when the lid is opened beyond its designed opening point ("overextended"), the lid and/or base components press against the clip and cause the clip to open and release the pin. Although this may be convenient in some situations to allow for release of the lid from the base, in many other situations the lid falling off of the base when the user pushes too hard on the lid becomes an annoyance. If the lid is overextended too far, the clips may become permanently overextended and damaged making it difficult to retain the lid on the base anytime the lid is opened.

SUMMARY

An implementation of a weatherproof electrical outlet cover may include a base unit having a face, an electrical device aperture, and a box mounting screw aperture therethrough. A lid may be coupled to the base unit through a hinge clip and a hinge pin. The hinge clip may comprise an open side substantially parallel to an axis of rotation for the hinge pin and a rotation stop adjacent to the open side of the hinge clip and extending away from the axis of rotation. When the lid is opened, interference between a stop contact on the cover and the rotation stop on the hinge clip causes the hinge clip to tighten against the hinge pin when the lid is opened with respect to the base to a point where the stop contact presses against the rotation stop.

In particular implementations, the hinge clip is integral with the base and the hinge pin is integral with the lid. In other particular implementations, the hinge clip is integral with the lid and the hinge pin is integral with the base.

An implementation of an electrical device cover may comprise a lid comprising at least one hinge pin coupled to the lid along a first side and a stop contact adjacent the hinge pin, the hinge pin comprising an axis of rotation; and a base unit comprising at least one electrical device aperture therethrough and at least one hinge clip coupled to the base unit along a first side. The hinge clip may comprise an open side substantially parallel to the axis of rotation of the hinge pin; and a rotation stop adjacent to the open side of the clip and extending away from the base. The hinge clip may be coupled around the hinge pin forming a hinge and the lid may be configured to pivot with respect to the base about the axis of rotation of the hinge pin. In such implementations, interference between the stop contact on the lid and the rotation stop on the hinge clip may cause the hinge clip to tighten against the hinge pin when the lid is opened with respect to the base to a point where the stop contact presses against the rotation stop.

In particular implementations, the hinge clip may be configured to comprise an elongated passage axially aligned with the axis of rotation of the hinge pin and the open side of the hinge clip may be substantially parallel to the axis of rotation. The rotation stop may also extend along the open side substantially parallel to the axis of rotation for the hinge pin. In particular implementations, the stop contact may be elongated and extend adjacent to the hinge pin substantially parallel to the axis of rotation. The hinge clip may be formed primarily of a plastic material that may be pliable. The entirety of the electrical device cover may be formed primarily of plastic.

A method of opening an electrical device cover may comprise rotatably coupling a lid to a base unit, rotating the lid with respect to the base unit about an axis of rotation of a hinge clip and hinge pin, and tightening the hinge clip on the hinge pin through opening the lid with respect to the base. In particular implementations, tightening the hinge clip on the hinge pin comprises pliably compressing the hinge clip on the pin hinge. In other particular implementations, pliably compressing the hinge clip on the hinge pin further comprises pressing a rotation stop on the hinge clip with a stop contact adjacent to the pin hinge when the lid is opened.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein, as virtually any components consistent with the intended operation of a method and/or system implementation for an electrical outlet cover may be utilized. Many additional components and assembly procedures known in the art consistent with the intended electrical outlet cover and/or assembly procedures for an electrical outlet cover will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical outlet covers and implementing components, consistent with the intended operation.

Figure 1:
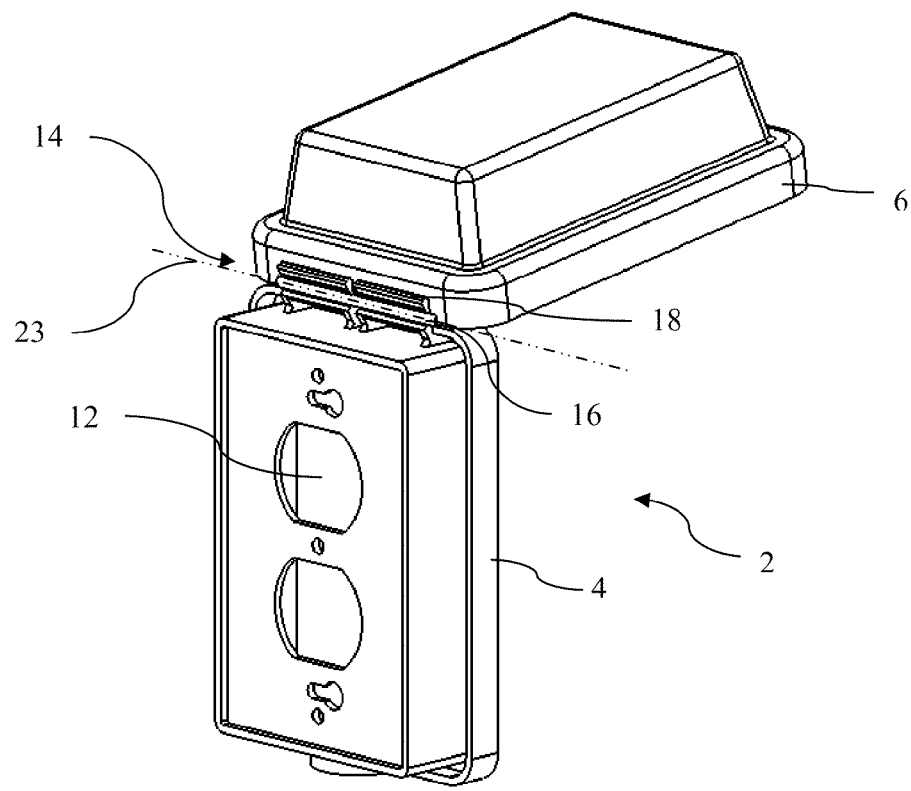
FIG. 1 is a rear perspective view of a particular implementation of an electrical outlet cover with the lid coupled to the base by a pin and clip hinge.
Figure 2:
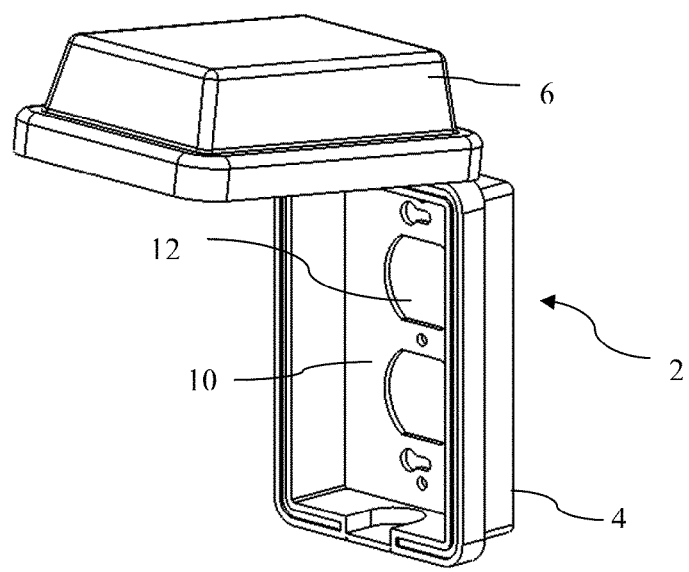
FIG. 2 is a front perspective view of the electrical outlet cover of FIG. 1.

Referring to FIGS. 1 and 2, a particular implementation of an electrical outlet cover 2 is illustrated. The electrical outlet cover 2 may comprise a base unit 4 coupled to a lid 6. While the base unit 4 illustrated is shown as a single piece, in other implementations the base unit 4 may be formed of any number of pieces coupled together such as, for example, an adapter and base assembled as a base unit. Particular implementations of an electrical outlet cover 2 may be weatherproof and, therefore, resist entry of water and other contaminants through use of the lid 6 and other structures. Although the particular implementation shown in the drawings is configured as a while-in-use outlet cover, other particular implementations of an electrical outlet cover may be configured as a flat cover as well or even for other configurations of a while-in-use cover that are not bubble covers.

The electrical outlet cover 2 for the particular implementation illustrated in FIG. 1 is shown with the lid 6 in an open position with respect to the base unit 4. When installed on an electrical device, the face of the electrical device may extend through an electrical device aperture 12 configured to accommodate the electrical device in the face 10 of the base unit 4. The base unit 4 may also include removable tabs that allow the electrical device aperture 12 to be converted to accommodate a second electrical device type. In addition, the base unit 4 may comprise an adapter plate that may allow the electrical device aperture 12 to be converted to accommodate a second electrical device type. In particular implementations of an electrical outlet cover 2, the adapter plate may also include a removable tab to allow the electrical device aperture 12 to be converted to accommodate a second electrical device type. Relevant teachings regarding removable tabs and adapter plates may be found in U.S. Pat. No. 6,960,721 to Shotey et al. entitled "Convertible Electrical Device Cover Having Removable Tabs With Offset Grooves," the disclosure of which is hereby incorporated herein by reference.

Figure 4:
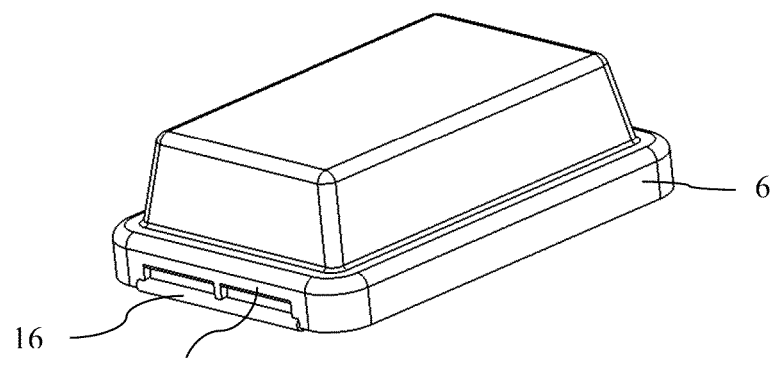
FIG. 4 is a perspective view of the lid of the electrical outlet cover of FIG. 1.

In this particular implementation, the electrical outlet cover assembly comprises hinge assembly 14 comprising one or more pins 16 and one or more clips 18. For the particular implementation of FIG. 1, the pins 16 are formed integrally with the lid 2 along a side of the lid (see also FIG. 4), and the clips 18 are formed integrally with the base 4 along a side of the base 4. Alternatively, in other implementations, the clips may be formed integrally with the base and the pins may be formed integrally with the lid. In still other implementations, one or more clips and/or pins may be detachably connected to either the base and/or lid. In either any, however, with reference to FIG. 5, each of the one or more clips 18 comprises a closed side 20 and an open side 22. Each pin comprises center axis 23 (FIG. 1) that extends through a center axis of the one or more hinge clips 18 when the hinge clips 18 are coupled with the pins 16. For the configuration where the clip(s) 18 are on the base and the pin(s) 16 are on the lid, the closed side 20 of the clip 18 is facing toward the lid 6 and the open side 22 of the clip 18 is facing toward the rear side of the base 4 (away from the lid 4). In the reverse, if the clip(s) 18 were on the lid 6, the open side of the hinge clip would be positioned to face away from the base 4 so that the closed side(s) of the clip(s) are between the pin(s) and the edge to which they are coupled.

Figure 3:
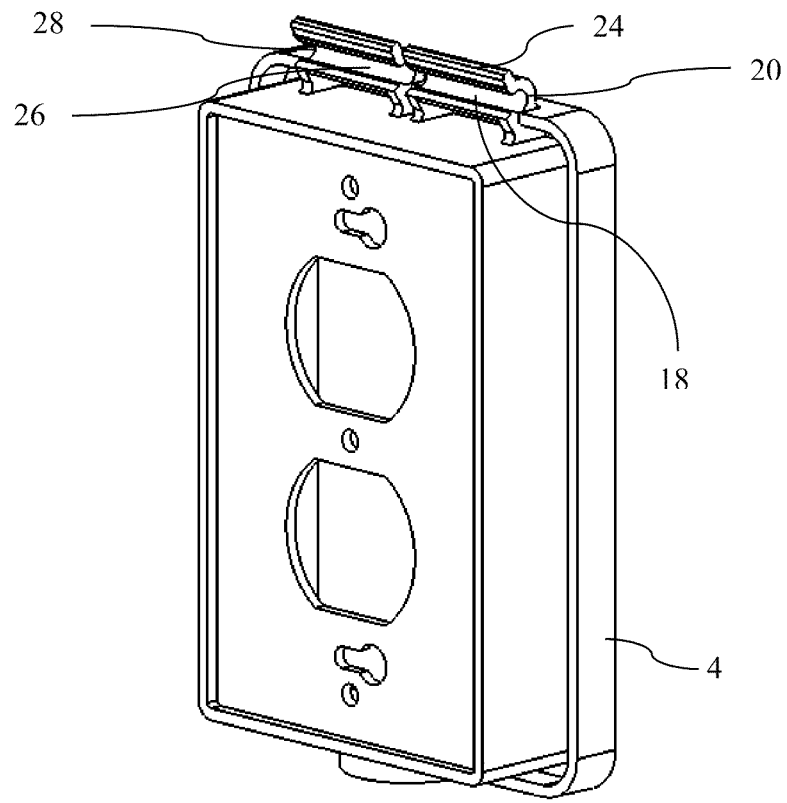
FIG. 3 is a rear perspective view of the base of the electrical outlet cover of FIG. 1.
Figure 5:
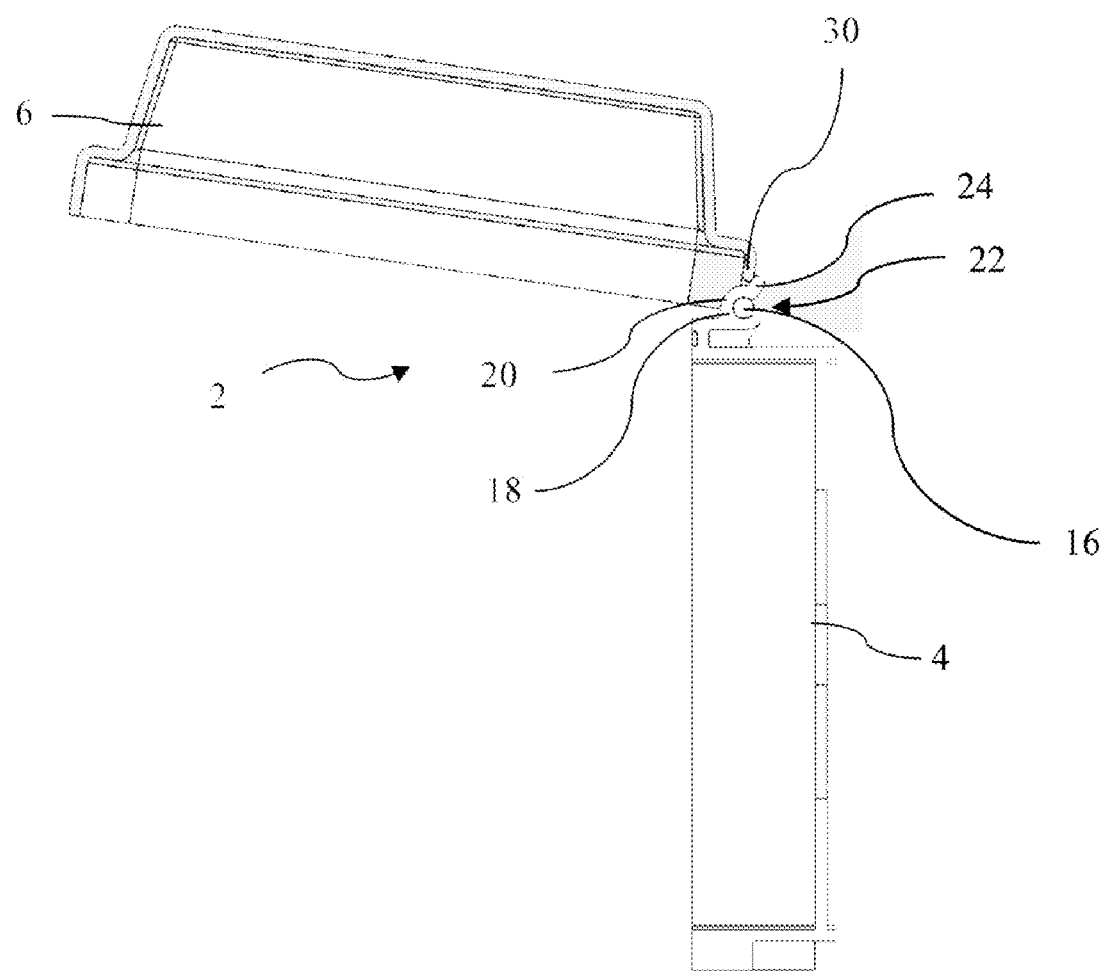
FIG. 5 is a side cross-section view of the electrical outlet cover assembly of FIG. 1 taken through the hinge to illustrate the interaction of the hinge with the lid of this particular implementation.

As illustrated more closely in FIGS. 3 and 5, to reduce the likelihood of the lid 6 being overextended, one or more rotational stops 24 may be provided as part of the hinge clamp 18. In conventional designs, when the lid is rotated away from the base and encounters the hinge stops or the edge of the base, a conventional hinge clip is forced open slightly under the stress. Since the hinge clip member is often made of a plastic material, too much force exerted on the hinge clip member may cause permanent deformation and may result in causing the hinge clip member to open to the degree that it can no longer securely hold the hinge pin. In the particular implementation of FIG. 1, the hinge clip 18, the hinge clip comprises an elongated passage 26 opened at each end and along one side 28. The hinge clip 18 further comprises a rotational stop 24 that extends from the hinge clip 18 along the open side 28 and extending in a direction generally away from the axis of rotation 23 for the hinge pin 16.

In other particular implementations, while the rotational stop 24 may still be coupled to the hinge clip 18 adjacent to the open side 28 that is farthest away from the base or lid side to which it is coupled, it may not extend the full length of the clip side 22. Because the base and hinge clip 18 are conventionally formed of a flexible plastic material, the hinge clip 18 is able to function as a clip that expands to receive the mating pin and still clips to secure it into place.

In use, the base 4 and the lid 6 are coupled together through the one or more hinge clips 18 on the base 4 and the one or more hinge pins 16 on the lid 6. To couple the hinge clip 18 with the hinge pin 16, the hinge pin 16 is placed over and behind the rotational stop 24 of a hinge clip 18 to access the open side 28 of the hinge clip 18. By pulling the hinge pin 16 toward the closed side 20 of the hinge clip 18, the opening of the hinge clip 18 flexibly expands to receive the hinge pin 16 and then returns to its original form.

With specific reference to FIG. 5, if the lid 6 is rotated beyond its design limits, a stop contact 30 on a side of the lid 6 adjacent to the pin 16 interferes with the rotational stop 24 on the hinge clip 18. As a result of the pressure of the stop contact 30 against the rotational stop 24, the hinge clip 18 is tightened around the hinge pin 18 (rather than being widened as is done in conventional clip and pin hinges for electrical device covers) and the hinge clip 18 is not overextended. In fact, it is not extended at all but is tightened. This configuration is much more likely to reduce the likelihood that the hinge will be damaged by overextending the rotation of the lid. Particularly in implementations where the hinge clip 18 is formed primarily of a pliable plastic material such as polyvinyl chloride (PVC) or other known pliable plastic, overextension of the lid rotation merely pliably compresses the hinge clip on the hinge pin and better retains the hinge pin within the hinge clip rather than releasing it.

While in the particular implementations illustrated in this document, the stop contact on the surface of the lid encounters the rotational stop on the hinge clip, in other implementations projections, notches, or apertures may be used that extend from the lid, engage with the ends of the hinge clip, or permit partial penetration of the ends of one or more rotational stops or stop contacts into the lid as stop contacts to further limit or extend range of motion. Also, the one or more hinge clips and/or one or more hinge pins may be molded with the lid and/or base as a single piece, and thereby be coupled, or be separately formed and coupled with the lid and/or base. While the particular implementations disclosed in this document show hinge members on one side of the lid and the base, other implementations may include hinge members on one or even multiple adjacent or opposing sides. Other particular implementations may include hinge members on a corner of the lid and the base or otherwise angled axis of rotation with respect to the orientation of the electrical device orientation.

Implementations of an electrical outlet cover and implementing components (lids, base units, hinge clips, hinge pins, etc.) may be constructed of a wide variety of materials. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. For the exemplary purposes of this disclosure, the lid and base unit may be formed of a plastic material like a polyvinyl chloride (PVC).

Some components defining any electrical box implementation may be manufactured simultaneously and integrally joined with one another, while other components may be purchased pre-manufactured or manufactured separately and then assembled with the integral components. The various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components. For the exemplary purposes of this disclosure, the lid and base may be formed separately by an injection molding process, and then coupled together by a separate assembly step.

In places where the description above refers to particular implementations of an electrical outlet cover, it should be readily apparent that a number of modifications may be made without departing from the spirit thereof and that these implementations may be applied to other electrical outlet covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A cover comprising:
    a base unit coupled to a lid through a hinge, the hinge comprising:
    at least one hinge pin coupled to the cover, the hinge pin comprising an axis of rotation; and
    at least one hinge clip rotatably coupled to the hinge pin, the hinge clip comprising:
    an open side substantially parallel to the axis of rotation of the hinge pin; and
    a rotation stop adjacent to the open side of the hinge clip and extending away from the axis of rotation;
    wherein interference between a stop contact on the cover and the rotation stop on the hinge clip causes the hinge clip to tighten against the hinge pin when the lid is opened with respect to the base to a point where the stop contact presses against the rotation stop.

2. The electrical device cover of claim 1, wherein the hinge clip is integral with the base and the hinge pin is integral with the lid.

3. The electrical device cover of claim 1, wherein the hinge clip further comprises an elongated passage axially aligned with the axis of rotation of the hinge pin.

4. The electrical device cover of claim 3, wherein the open side of the hinge clip is substantially parallel to the axis of rotation of the hinge pin.

5. The electrical device cover of claim 4, wherein the rotation stop extends along the open side substantially parallel to the axis of rotation of the hinge pin.

6. The electrical device cover of claim 1, wherein the stop contact is elongated and extends adjacent to the hinge pin substantially parallel to the axis of rotation of the hinge pin.

7. The electrical device cover of claim 1, wherein the hinge clip is formed primarily of plastic.

8. The electrical device cover of claim 7, wherein the plastic is pliable.

9. The electrical device cover of claim 1, wherein the hinge clip is integral with the lid and the hinge pin is integral with the base.

10. An cover comprising:
    a lid comprising at least one hinge pin coupled to the lid and a stop contact adjacent the hinge pin, the hinge pin comprising an axis of rotation; and
    a base unit comprising at least one hinge clip coupled to the base unit, the hinge clip comprising:
    an open side substantially parallel to the axis of rotation of the hinge pin; and
    a rotation stop adjacent to the open side of the clip and extending away from the base;

wherein the hinge clip is pivotably coupled around the hinge pin forming a hinge and the lid pivots with respect to the base about the axis of rotation of the hinge pin; and wherein interference between the stop contact on the lid and the rotation stop on the hinge clip causes the hinge clip to tighten against the hinge pin when the lid is opened with respect to the base to a point where the stop contact presses against the rotation stop.

11. The electrical device cover of claim 10, wherein the hinge clip is integral with the base and the hinge pin is integral with the lid.

12. The electrical device cover of claim 10, wherein the hinge clip further comprises an elongated passage axially aligned with the axis of rotation of the hinge pin.

13. The electrical device cover of claim 12, wherein the open side of the hinge clip is substantially parallel to the axis of rotation of the hinge pin.

14. The electrical device cover of claim 13, wherein the rotation stop extends along the open side substantially parallel to the axis of rotation of the hinge pin.

15. The electrical device cover of claim 10, wherein the stop contact is elongated and extends adjacent to the hinge pin substantially parallel to the axis of rotation of the hinge pin.

16. The electrical device cover of claim 9, wherein the hinge clip is formed primarily of plastic.

17. The electrical device cover of claim 16, wherein the plastic is pliable.

18. A method of opening an cover, the method comprising:
rotatably coupling a lid to a base unit;
rotating the lid with respect to the base unit about an axis of rotation of a hinge clip and hinge pin; and
tightening the hinge clip on the hinge pin through opening the lid with respect to the base.

19. The method of claim 18, wherein tightening the hinge clip on the hinge pin comprises pliably compressing the hinge clip on the hinge pin.

20. The method of claim 19, wherein pliably compressing the hinge clip on the hinge pin further comprises pressing a rotation stop on the hinge clip with a stop contact adjacent to the hinge pin when the lid is opened.

\* \* \* \* \*